(12) United States Patent
Garcia Benitez et al.

(10) Patent No.: US 8,784,250 B2
(45) Date of Patent: Jul. 22, 2014

(54) CONTINUOUSLY VARIABLE TRANSMISSION SYSTEM

(75) Inventors: Francisco de Asis Garcia Benitez, Seville (ES); Francisco de Borja Perez Guerrero, Seville (ES); Gabriel Centeno Baez, Seville (ES); Francisco Jose Morales Sanchez, Seville (ES)

(73) Assignee: Universidad de Sevilla, Sevilla (ES)

( * ) Notice: Subject to any disclaimer, the term of this patent is extended or adjusted under 35 U.S.C. 154(b) by 412 days.

(21) Appl. No.: 13/140,005

(22) PCT Filed: Jun. 26, 2009

(86) PCT No.: PCT/ES2009/000175
§ 371 (c)(1),
(2), (4) Date: Jun. 15, 2011

(87) PCT Pub. No.: WO2010/070158
PCT Pub. Date: Jun. 24, 2010

(65) Prior Publication Data
US 2012/0220414 A1    Aug. 30, 2012

(30) Foreign Application Priority Data
Dec. 19, 2008  (ES) .................................. 200803625

(51) Int. Cl.
    *F16H 29/04*  (2006.01)
(52) U.S. Cl.
    USPC ............................................ 475/16; 475/162
(58) Field of Classification Search
    USPC .................. 475/14, 16, 162; 74/25; 123/197.1
    See application file for complete search history.

(56) References Cited

U.S. PATENT DOCUMENTS

| 1,860,383 | A | * | 5/1932 | Chalmers ...................... 475/255 |
| 2,088,332 | A | * | 7/1937 | Marchou ........................... 74/52 |
| 3,581,584 | A |   | 6/1971 | Williams |
| 4,282,772 | A |   | 8/1981 | Franch et al. |

(Continued)

FOREIGN PATENT DOCUMENTS

| GB | 19904 | 0/1913 |
| GB | 21414 | 0/1912 |

(Continued)

OTHER PUBLICATIONS

International Search Report, mailing date Nov. 25, 2009, for corresponding International Application No. PCT/ES2009/000175 with English translation.

*Primary Examiner* — Roger Pang
(74) *Attorney, Agent, or Firm* — Intellectual Property Law Group LLP

(57) ABSTRACT

The invention relates to a continuously variable transmission (CVT) system, governed by an inertial mechanism that provides an additional degree of freedom, conferring dynamic properties on the transmission. The complete system includes three distinct subsystems. The first subsystem transforms the rotating movement from the driving system into a movement with oscillating angular speed and regulates the amplitude of said movement. The oscillating rotation at the output of the first subsystem is used to drive the second subsystem, which acts as a regulating element by means of the inertial mechanism. In this manner, the second subsystem acts as a torque-regulating element, providing a signal representing the oscillating angular speed at the output shaft thereof. The oscillating rotation at the output of the second subsystem is rectified in the third subsystem, thereby providing a signal representing angular speed in a single direction of rotation at the output shaft.

4 Claims, 4 Drawing Sheets

(56) References Cited

U.S. PATENT DOCUMENTS

| | | | |
|---|---|---|---|
| 4,336,870 A | 6/1982 | Shea | |
| 4,535,730 A * | 8/1985 | Allen | 123/78 F |
| 4,796,477 A * | 1/1989 | Brems | 74/52 |
| 5,108,352 A * | 4/1992 | Pires | 475/170 |
| 5,116,292 A * | 5/1992 | Han | 475/16 |
| 5,134,894 A | 8/1992 | Tam | |
| 5,833,567 A | 11/1998 | Fernandez | |
| 5,860,321 A | 1/1999 | Williams | |
| 5,937,701 A * | 8/1999 | Mimura | 74/117 |
| 6,044,718 A | 4/2000 | Lester | |
| 6,068,570 A * | 5/2000 | Han | 475/207 |
| 6,371,881 B1 * | 4/2002 | Garcia Benitez et al. | 475/269 |
| 6,537,168 B1 * | 3/2003 | Han | 475/8 |
| 6,857,412 B2 * | 2/2005 | Ozdamar | 123/197.1 |
| 7,926,462 B2 * | 4/2011 | Chio | 123/197.1 |
| 2001/0047925 A1 * | 12/2001 | Sullivan, Jr. | 198/750.8 |
| 2008/0210026 A1 * | 9/2008 | Chio | 74/52 |
| 2011/0150650 A1 * | 6/2011 | Grande | 416/108 |
| 2012/0243991 A1 * | 9/2012 | Han | 416/9 |
| 2012/0299301 A1 * | 11/2012 | Han | 290/52 |
| 2013/0274056 A1 * | 10/2013 | Han | 475/248 |

FOREIGN PATENT DOCUMENTS

| | | |
|---|---|---|
| GB | 185022 | 8/1922 |
| GB | 363985 A | 12/1931 |
| GB | 405610 A | 2/1934 |
| GB | 531921 A | 1/1941 |
| GB | 610088 A | 10/1948 |
| GB | 739713 A | 11/1955 |
| GB | 2215415 A | 9/1989 |

* cited by examiner

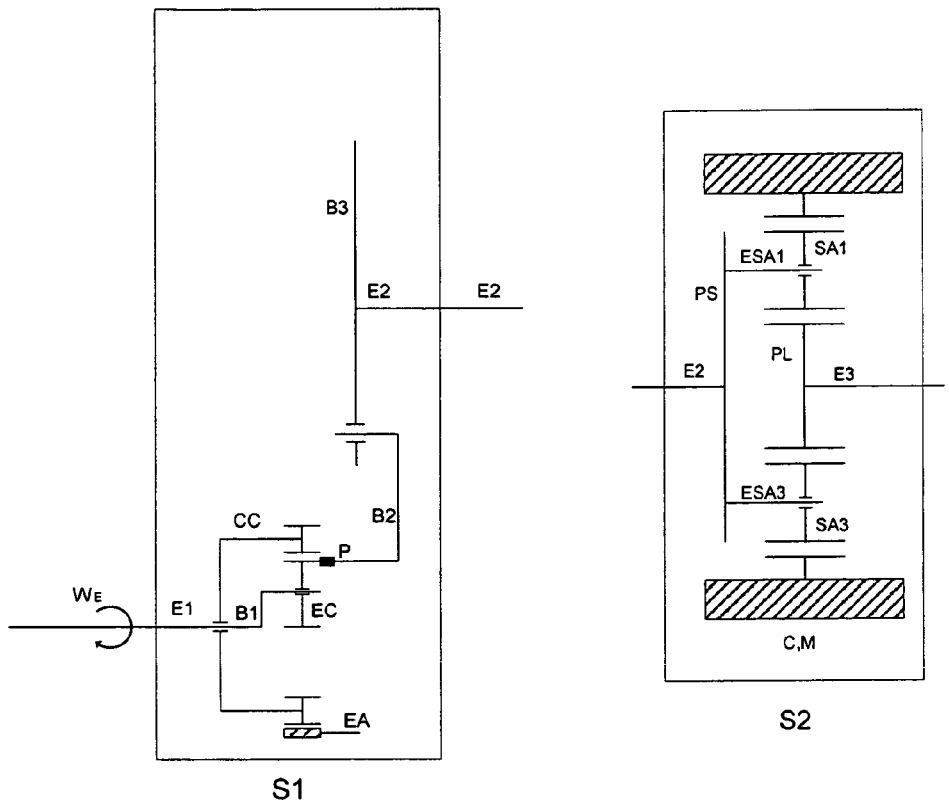
FIG. 2
FIG. 3
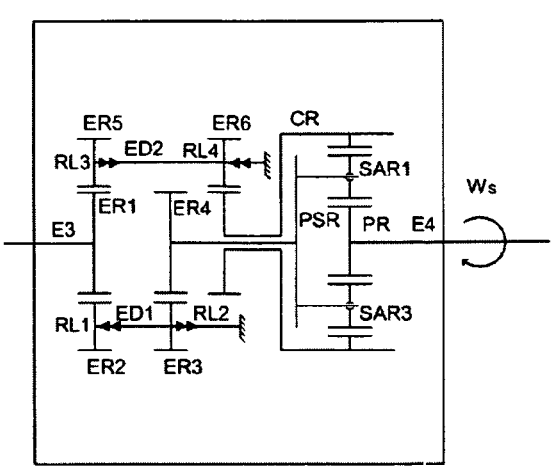
FIG. 4

S3

S3

CONTINUOUSLY VARIABLE TRANSMISSION SYSTEM

CROSS-REFERENCE TO RELATED APPLICATIONS

This application is a U.S. National Phase application under 35 U.S.C. §371, of Iternational Application No. PCT/ES2009/000175, with an international filing date of Jun. 26, 2009, and claims benefit of Spain Application No. P200803625 filed on Dec. 19, 2008, and which are hereby incorporated by reference for all purposes.

OBJECT OF THE INVENTION

This invention, as expressed in the heading of this descriptive memory refers to a continuously variable transmission system with inertial regulating.

It basically includes three subsystems that are related to each other, in a manner that the first of them provides an oscillating angular speed with variable amplitude, a second subsystem that includes an inertial mechanism and a third subsystem with movement rectification, which provides a single direction of rotation at its output.

Since this is a continuously variable transmission system, it includes an unlimited number of transmission ratios within the possible gear ratio interval, while a continuous variation in the transmission ratio may be obtained.

This invention has a direct application in the automobile industry, in any industrial application that requires a power transmission system as well as in any other application that requires torque regulating and changes in speed.

BACKGROUND OF THE INVENTION

Fixed ratio transmissions, regardless of whether they are manual or automatic, include a discrete number of transmission ratios or gears. In comparison with conventional transmissions, in a continuously variable transmission or CVT, the transmission ratio between the input and output shafts may be progressively varied in a specific interval of possible ratios. The possibility of incorporating an unlimited number of transmission ratios provides an added parameter in order to optimize one or several variables of the vehicle. This way, with a specific variation in the transmission ratio, we can achieve conditions of high power, low consumption or a compromised ratio between both variables.

One possible classification establishes two large groups of continuously variable transmissions, the kinematic and dynamic types. In a kinematic CVT, the progressive change in transmission ratio is carried out by actuating on a specific element, resulting in the transmission ratio being fixed at a specific value and requires acting upon the element once again in order to change it. On the other hand, in a dynamic type CVT, as well as being able to act upon a kinematic regulating element, the transmission ratio also depends on the external conditions to which the transmission is subjected to. This means that the transmission ratio will be determined by the kinematic characteristics as well as by variables such as the speed of the input shaft or the resistant torque exerted on the output shaft.

The dynamic type continuously variable transmissions originate from the innovative work carried out by Hunt, which were published in GB patents 21,414 of 1912 and GB Patent 19,904 of 1913, where an inertial type transmission system is described with the dynamic transmission principle but without a direct application like CVT.

The first documented continuously variable type dynamic transmission originates from the work of Constantinesco, described in his GB Patent 185,022 of 1922 and in his subsequent patents, which describe methods for improving the power transmission of the primary shafts of vehicles that operate using internal combustion engines. In these transmissions, the torque is regulated using a pendulum or other inertial elements.

Chalmers, in U.S. Pat. No. 1,860,383 of 1932 introduces his oscillating torque transmission system with movement of the output shaft in a single direction of rotation. In this case, the regulating element consists of a series of planet gears with eccentric masses that generate an oscillating torque at the output due to the inertial forces these masses are subjected to. Similar type transmissions were designed by Tam, 1992 (U.S. Pat. No. 5,134,894) and Fernandez, 1998 (U.S. Pat. No. 5,833,567), which were also based on planet gears with eccentric masses. Also with oscillating masses, but in this case without these carrying out complete rotations about themselves, we have the torque converter patent of 1982 owned by Shea (U.S. Pat. No. 4,336,870); this transmission includes two symmetric masses shaped like a cam that oscillate, thus regulating the torque of the output shaft. Also based on inertial regulating using eccentric masses we have William's torque converter of 1971 (U.S. Pat. No. 3,581,584).

Two dynamic type transmission patents exist later to the one mentioned above that have the same principle of operation thought they use different technical solutations. The first one is U.S. Pat. No. 5,860,321 of 1999 provided by Williams, where he proposes new solutions for rectifying movement using a differential rectifier with two free wheels as well as specific configurations and new technical solutions focussed on increasing the compactness as well as the efficiency of the power transmission. The second transmission of this type provided by Lester in 2000 (U.S. Pat. No. 6,044,718) proposes solutions among which a power transmission regulating system stands out. The complete system is a CVT with inertial regulating and with the possibility of being coupled.

A large number of dynamic transmissions need a subsystem that transform a continuum rotational MOTION INTO A RATCHETING MOVEMENT. There are several mechanisms able to perform this task, from the simplest ones as a four-bar mechanism or a system of grooved plates, to more sophisticated devices as those patented by Sullivan (US 2001/0047925),Chio (U.S. Pat. No. 7,926,462B2, US 2008/0210026A1), Ozdamar (U.S. Pat. No.6,857,412B2) and Marchou (US 2088332A).

SUMMARY OF THE INVENTION

The invention consists of a continuously variable transmission system with inertial regulating. Regulating is carried out using an inertial mechanism comprised of an epicyclic train that provides an additional degree of freedom. A specific mass is added to the element of the epicyclic train that includes this degree of freedom, which provides a dynamic character to the transmission and causes the train to act as a regulating element of the output shaft resistant torque. The complete system includes three different subsystems. A first subsystem that converts the signal provided by the driving system into an oscillating angular speed signal while it regulates the amplitude of said speed signal. This angular speed is used to drive the epicyclic train, which constitutes the second subsystem and is the inertial regulating mechanism for the transmission. This way, the second subsystem provides an oscillating torque regulated signal. The oscillating signal at the output of the second subsystem must be rectified in the third subsystem. In this manner, an angular speed signal in a single direction of rotation is finally obtained at the output shaft. Thus, a unidirectional torque capable of overcoming the resistant torque is applied at the transmission output shaft. This way, the complete system provides a torque that is adapted to the operating conditions it is subjected to such as the angular speed of the transmission input shaft as well as the resistant torque at the output shaft. Therefore, the invention consists of a dynamic type continuously variable transmission system with an oscillating nature.

The transmission system described in the object of this patent includes many advantages, among which the following are highlighted:

The use of any type of clutch system is not required.

The transmission system regulates itself providing a change ratio between the output and input shafts that is most adequate for the demands that the system is subjected to.

Since this is a continuously variable transmission system, it includes an unlimited number of transmission ratios within the interval of possible change ratios.

A continuous variation of the transmission ratio can be obtained in order to achieve specific operating conditions of high power, low consumption or a compromise relation between both variables.

From a commercial point of view, the characteristics of this transmission system are of great interest to the industry.

This transmission system has a direct application in the automobile industry, in any industrial application that requires a power transmission system as well as in any other application that requires torque regulating and speed changes.

In order to provide a better explanation of this descriptive memory and as an integrating part thereof, figures are included below, which in an illustrative and not limiting manner represent the object of this invention.

BRIEF DESCRIPTION OF THE DRAWINGS

FIG. 2.—Consists of a schematic representation of subsystem S1 corresponding to the driving and amplitude regulating mechanism.

FIG. 3.—Consists of a schematic representation of subsystem S2 corresponding to the transmission's inertial regulating mechanism.

FIG. 4.—Consists of a schematic representation of subsystem S3 corresponding to the oscillating movement rectification at the inertial regulating mechanism's output.

DETAILED DESCRIPTION OF THE PREFERRED EMBODIMENTS

The inertial element of the developed dynamic CVT is comprised of an epicyclic reducer with mass added to the ring. Said epicyclic reducer is inserted in an inverted way into the CVT; therefore, the reducer's input shaft is connected to the planet carrier and the output shaft to the sun. Therefore, in an assembly of this type, the epicyclic reducer would be multiplying the input speed.

The transmission regulating is based on the aforementioned property of the inertial element and the assembly. When acceleration is applied to the planet carrier while the sun is maintained blocked, the ring's response is to accelerate with a similar type of outcome. Due to the acceleration experienced by the ring and while this acceleration lasts, a torque is generated at the sun. Once the ring acceleration process ceases, the torque at the sun is null.

As a consequence, by subjecting the planet carrier to a speed law that produces continuous accelerations, a resistant torque can be overcome at the output shaft. For this purpose, an angular speed law is used at the input shaft in the form of an oscillating signal, which is generated by means of a driving mechanism. At the same time, the driving mechanism regulates the amplitude of said angular velocity. The signal at the sun also has an oscillating nature; therefore, a movement rectifying mechanism is required.

The ring movement carries with it an additional degree of freedom. The adding of mass to the epicyclic train's ring allows said element to become a power regulating inertial mechanism. This regulating consists of cyclic power accumulations and cessions that allow the transmission to adapt to each one of the operating conditions it is subjected to.

Figure 1:
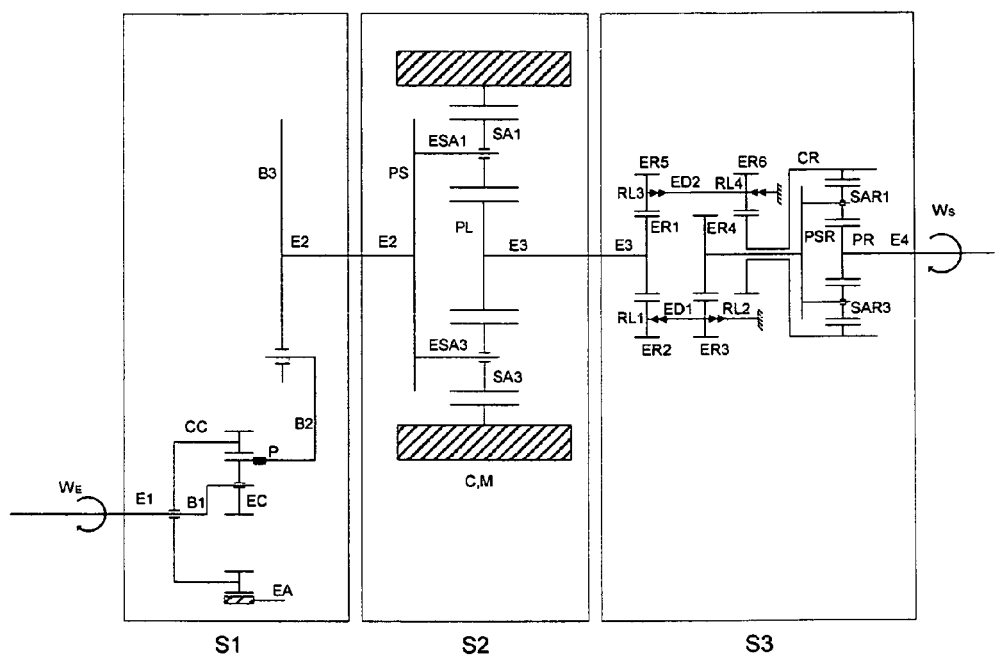
FIG. 1.—Consists of a detailed schematic representation of the three subsystems that comprise the complete transmission and the manner in which these are connected.

As seen in the FIG. 1, the complete transmission system includes three subsystems positioned in series.

Figure 7:
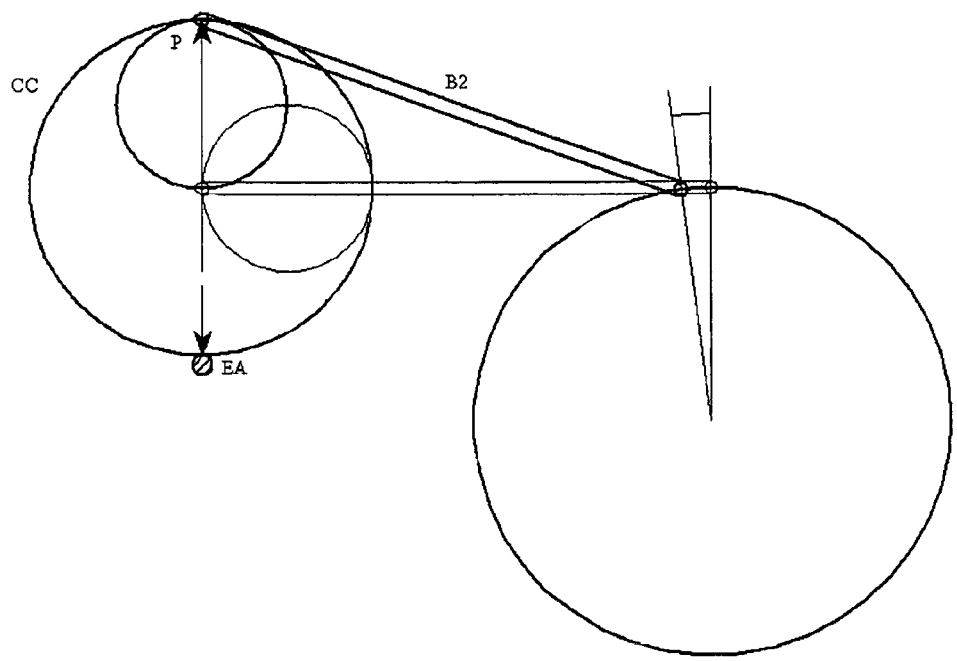
FIG. 7.—Consists of a schematic representation of the driving mechanism for the reference position corresponding to the minimum oscillation amplitude.

The purpose of the first subsystem S1 (FIG. 2) is to transform the signal originating from the driving system through shaft E1 (FIGS. 1 and 2) into an angular oscillating speed signal with a variable amplitude at shaft E2 (FIGS. 1, 2 and 3); this shaft is the input to the second subsystem S2 (FIG. 3). Rod B1 (FIGS. 1 and 2) consists of a crank with a fixed radius R, which transmits the circular movement of its end to control gear EC (FIGS. 1 and 2). This EC element is engaged with the control ring CC (FIGS. 1 and 2) and spinning about the inner face of the ring, while said ring is fixed in its position as determined by the driving element EA (FIGS. 1 and 2). Said EA element uses a worm gear to drive the outer face of control ring CC in order to control its relative position with respect to the reference position, corresponding, for example, to the minimum oscillating amplitude (FIG. 7). Rod B2 (FIGS. 1 and 2) is joined at a point P (FIGS. 1 and 2) to the element EC, with said point located at a radius R from the centre of the element EC. The union at point P is carried out in such a manner to allow the relative turn between the element EC and B2.

Figure 8:
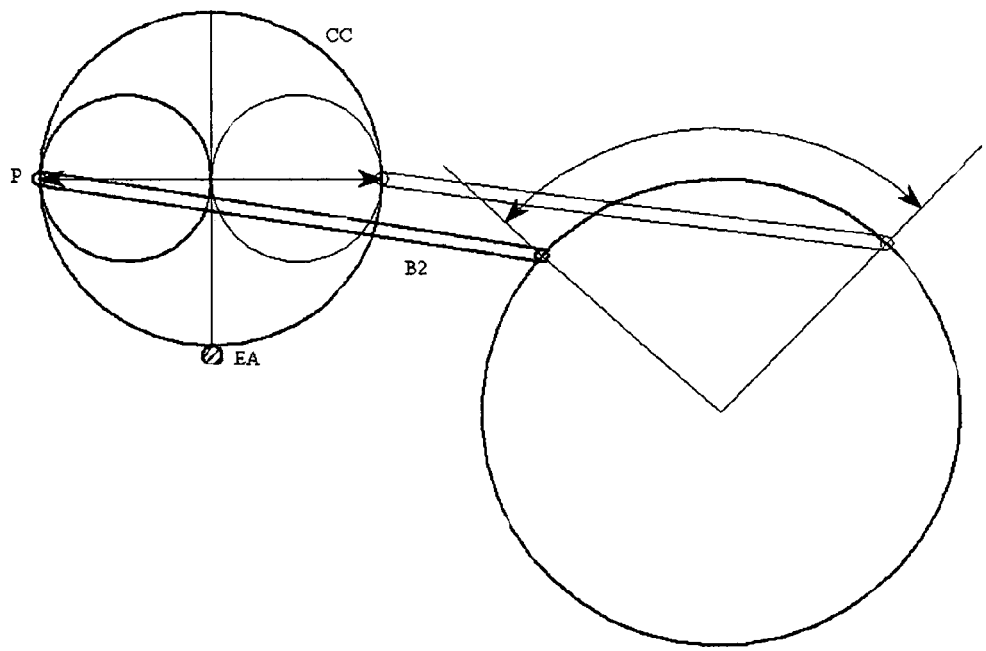
FIG. 8.—Consists of a schematic representation of the driving mechanism for the position corresponding to the maximum oscillation amplitude.

In the previous arrangement of subsystem S1, the diameter of control gear EC is equal to the radius of the inner face of control ring CC. Under this configuration, the hypocycloid curve generated by point P and therefore, the end of rod B2 at said point, degenerates to a straight line that describes the inner diameter of control ring CC. Driving shaft EA and modifying the position of ring CC with respect to the reference position, the different possible diameters are described. This way, the oscillation transmitted through rod B2 to rocker B3 (FIGS. 1 and 2) is a function of the described diameter and will vary from an oscillation corresponding to a minimum amplitude at the reference position (FIG. 7) to that which generates a maximum amplitude (FIG. 8), and which corresponds to a diameter that is out of phase at a right angle with respect to the reference angle.

The second subsystem S2 (FIG. 3) uses the oscillating signal at the output of the first subsystem S1, acting as a torque regulating element by means of an inertial mechanism consisting of an epicyclic train, to which a mass M is added at ring C (FIGS. 1 and 3) The planet carrier PS is joined to planets SA1-SA3 by means of the corresponding shafts ESA1-ESA3 as shown in FIGS. 1 and 3. These planets are engaged to ring C as well as to sun PL (FIGS. 1 and 3), in a manner so the oscillating movement is transmitted to both elements. A mass M is uniformly added to ring C, with which said ring acquires the function of the transmission's inertial regulating element. Two predominant power transmission modes exist in subsystem S2, through which power is transmitted from the E1 input shaft to the E4 output shaft (FIGS. 1 and 4). The power is transmitted in a manner that the law of oscillating angular accelerations that is exerted over the ring causes accelerations and decelerations of the ring associated with kinetic energy accumulations and cessions of subsystem S2. In the first of the operating modes, the power supplied to the transmission through shaft E1 is used to accelerate ring C, which accumulates kinetic energy and in providing torque to output shaft E4. In the second mode, the power supplied by input shaft E1 as well as the power released by ring C as it decelerates are used to supply torque to output shaft E4. A brief transition period exists between these two main modes of operation.

The third subsystem S3 (FIG. 4) transforms the oscillating signal coming from subsystem S2 into a single direction of rotation. This subsystem S3 consists of a rectifier mechanism that is based on free wheels or any other type of mechanical diodes. The movement of shaft E3 (FIGS. 1, 3 and 4), output shaft of subsystem S2 and input to subsystem S3, transmits its rotating movement to gear ER2 as well as to ER5 through gear ER1 as shown in FIGS. 1 and 4.

When the oscillating movement transmitted through shaft E3 rotates clockwise, free wheel RL1 (FIGS. 1 and 4) located on the inside of gear ER2 is engaged, while free wheel RL3 (FIGS. 1 and 4), located on the inside of gear ER5 is disengaged. Therefore, in this configuration the movement is transmitted only through gear ER2, which in turn transmits the movement to gear ER3 (FIGS. 1 and 4) by means of splitting shaft ED1 (FIGS. 1 and 4). The movement of gear ER3 is transmitted to gear ER4 (FIGS. 1 and 4), which spins attached to the planet carrier of the movement rectifier mechanism PSR (FIGS. 1 and 4). The direction of rotation of the planet carrier is transmitted to the rectifier mechanism's sun and therefore to output shaft E4 by means of planets SAR1-SAR3 (FIGS. 1 and 4). In this configuration where shaft E3 turns clockwise, the ring of the rectifier mechanism CR (FIGS. 1 and 4) remains blocked; in other words, with a null angular speed. Since the tendency of the ring CR in this configuration, for a clockwise rotation of the planet carrier PSR would be to rotate in the opposite direction, free wheel RL4 (FIGS. 1 and 4), which is located in gear ER6 (FIGS. 1 and 4), is included in order to cancel its movement in that direction keeping ring CR blocked.

On the opposite, when the oscillating movement that is transmitted through shaft E3 is counter-clockwise, free wheel RL3 located inside gear ER5 is engaged while free wheel RL1 located inside gear ER2 is disengaged. In this configuration, the movement is transmitted only through gear ER5, which transmits the movement to gear ER6 through splitting shaft ED2 (FIGS. 1 and 4). The movement of gear ER6 is transmitted to the ring CR, which will rotate counter-clockwise. In this configuration where the ring of the rectifier mechanism CR rotates counter-clockwise, the planet carrier would tend to rotate counter-clockwise and therefore, it would force gear ER4 to rotate in that direction, which rotates attached to the planet carrier PSR. This tendency would cause gear ER3 to turn clockwise. This tendency would be cancelled by the installation of free wheel RL2 (FIGS. 1 and 4), which would cause the planet carrier PSR to be blocked. In this configuration, all of the ring's movement is transmitted to output shaft E4, which would turn clockwise.

Figure 5:
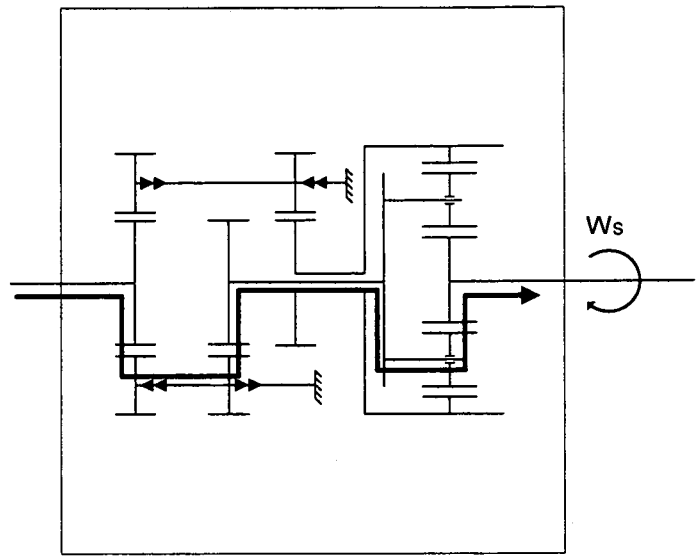
FIG. 5.—Represents the transmission flow of movement in a determined oscillating direction of the output shaft of subsystem S2.
Figure 6:
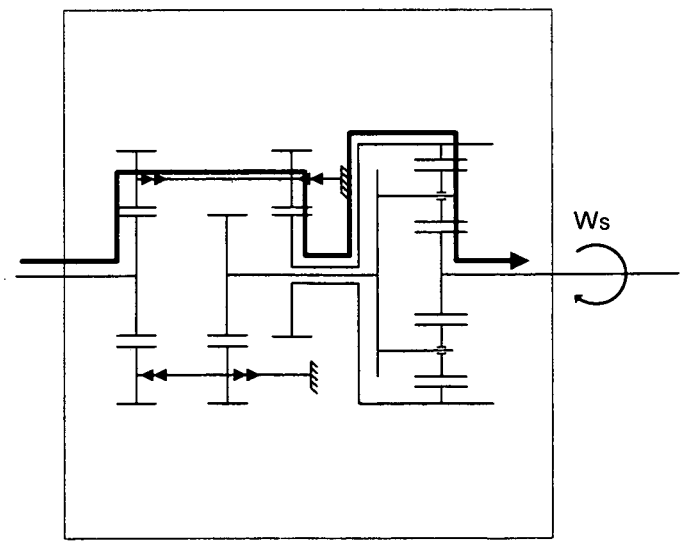
FIG. 6.—Represents the transmission flow of movement in the opposite oscillating direction of the output shaft of subsystem S2.

This way, when shaft E3 turns clockwise, the power transmission is carried out as shown in FIG. 5, while as shaft E3 turns counter-clockwise, the power transmission is carried out as shown in FIG. 6. This way, the oscillating movement is transformed into a single direction of rotation, taking advantage of the oscillating movements of shaft E3 in both directions in order to overcome a determined load value at the output shaft of transmission E4.

In subsystem S3, which includes the movement rectifier mechanism described herein, ratios between gears should be adequated in order for the rotation of the output shaft corresponding to both aforementioned configurations to be of equal magnitude for each of them. With this, the torque transmitted by subsystem S2 at shaft E3 would be symmetrical for a specific load value at the transmission's output shaft E4. This way, the operation of subsystem S2, the inertial regulating mechanism and therefore, of the entire transmission would be as symmetrical and regular as possible.

What is claimed is:

1. A continuously variable transmission system that is characterized in that it includes at least:

a first driving and regulating subsystem (S1) that transforms a rotating movement of a driving element connected to an input shaft into an oscillating angular movement with a variable amplitude at an output shaft (E2) of the first subsystem;

the first subsystem (S1) comprises a first rod (B1) with a fixed radius (R), which transmits the rotating movement of an end of the first rod, being the input shaft of the first subsystem (E1), to a control gear (EC), the control gear (EC) being engaged with a control ring (CC) and spinning about an inner face of the control ring (CC), while said control ring (CC) is fixed in its position as determined by a driving element (EA) which uses a worm gear to drive an outer face of the control ring (CC) in order to control its relative position with respect to a reference position;

the first subsystem (S1) comprises a second rod (B2) joined at a point (P) to the control gear (EC), said point (P) being located at a radius (R) equal to the radius of the first rod (B1) from a center of the control gear (EC), said point (P) at which the second rod is joined to the control gear is carried out in such a manner to allow a relative turn between the control gear (EC) and the second rod (B2); and a diameter of the control gear (EC) is equal to a radius of the inner face of the control ring (CC), a hypocycloid curve generated by the point (P) between the control gear (EC) and the second rod (B2) degenerates to a straight line that defines an inner diameter of the control ring (CC), driving the shaft of the driving element (EA) and modifying the position of the control ring (CC) with respect to the reference position, the different possible diameters are described and this way, the oscillation transmitted through the second rod (B2) to a rocker (B3) of the first subsystem (S1) is a function of the described diameter and will vary from an oscillation corresponding to a minimum amplitude at the reference position to that which generates a maximum amplitude, and which corresponds to a diameter that is out of phase at a right angle with respect to the reference angle;

a second torque inertial regulating subsystem (S2) that incorporates at least an additional mass and in an epicyclic train and having an input shaft that receives the oscillating movement with a variable amplitude of the first subsystem (S1), obtaining a regulated and oscillating angular movement at an output shaft (E3) of the second subsystem (S2);

the epicyclic train of the second subsystem (S2) includes a planet carrier (PS), which is attached to the input shaft (E2) of the second subsystem, a plurality of planet gears, (SA1) to (SA3), that engage with an inner face of a ring (C) of the epicyclic train, which has a distributed mass (M) and a sun gear (PL), which is attached to the output shaft (E3) of the second subsystem (S2); and a third movement rectification subsystem (S3) that converts the oscillating movement received from the second subsystem (S2) into a single direction of rotation at an output shaft of the third subsystem (S3).

2. The continuously variable transmission system in accordance with claim 1, characterized in that the movement rectification subsystem (S3) includes an epicyclic train having an output shaft (E4) of the third subsystem, which always rotates in a single direction, receives movement from an input shaft (E3) of the third subsystem, which is attached to a first gear (ER1) by means of a first transmission cycle that changes the direction of rotation from the input shaft (E3) of the third subsystem to the output shaft (E4) of the third subsystem and by means of a second transmission cycle that maintains the direction of rotation from the input shaft (E3) of the third subsystem to the output shaft (E4) of the third subsystem.

3. The continuously variable transmission system in accordance with claim 2, characterized in that the movement rectification subsystem (S3) includes:

a second gear (ER2) and a third gear (ER5) connected to the first gear (ER1) attached to the input shaft (E3) of the third subsystem, and the second gear (ER2) is connected to a fourth gear (ER3) by means of a first splitting shaft (ED1) and the third gear (ER5) is connected to a fifth gear (ER6) by means of a second splitting shaft (ED2);

a free wheel (RL1) located on the inside of the second gear (ER2);

a second free wheel (RL3) located on the inside of the third gear (ER5);

a third free wheel (RL4) located on the inside of the fifth gear (ER6);

a fourth free wheel (RL2) located on the inside of the fourth gear (ER3);

a sixth gear (ER4), connected to the fourth gear (ER3), and which is attached to a planet carrier (PSR) of the third subsystem (S3);

a sun (PR) of the third subsystem (S3), connected to the planet carrier (PSR) of the third subsystem (S3), and connected to the plurality of planets (SAR1) to (SAR3), and attached to the output shaft (E4); and the plurality of planets (SAR1) to (SAR3) are connected to a ring gear (CR) of the epicyclic train which is engaged with the fifth gear (ER6).

4. The continuously variable transmission system in accordance with claim 1, characterized in that the amplitude of the oscillating output speed of the first subsystem is not regulated, and therefore the entire system acts as a torque converter.

* * * * *